US011387019B2

(12) United States Patent
Joshi et al.

(10) Patent No.: US 11,387,019 B2
(45) Date of Patent: Jul. 12, 2022

(54) GROMMETS FOR HOLDING CABLES

(71) Applicant: CommScope Technologies LLC, Hickory, NC (US)

(72) Inventors: Aviral Joshi, Chicago, IL (US); Ronald A. Vaccaro, Taylorsville, NC (US); Christopher Stockman, Joliet, IL (US)

(73) Assignee: CommScope Technologies LLC, Hickory, NC (US)

( * ) Notice: Subject to any disclaimer, the term of this patent is extended or adjusted under 35 U.S.C. 154(b) by 264 days.

(21) Appl. No.: 16/521,032

(22) Filed: Jul. 24, 2019

(65) Prior Publication Data

US 2020/0043637 A1 Feb. 6, 2020

Related U.S. Application Data

(60) Provisional application No. 62/712,631, filed on Jul. 31, 2018.

(51) Int. Cl.
*H01B 17/58* (2006.01)
*G02B 6/44* (2006.01)
*H01B 17/66* (2006.01)
*H02G 3/32* (2006.01)
*B60R 16/02* (2006.01)

(52) U.S. Cl.
CPC ......... *H01B 17/583* (2013.01); *G02B 6/4439* (2013.01); *H01B 17/66* (2013.01); *H02G 3/32* (2013.01); *B60R 16/0215* (2013.01); *B60R 16/0222* (2013.01)

(58) Field of Classification Search
CPC .......... H02G 3/30; H02G 3/32; H02G 15/007; H02G 15/046
See application file for complete search history.

(56) References Cited

U.S. PATENT DOCUMENTS

| 4,431,152 | A | * | 2/1984 | Reed, Jr. | H02G 3/0683 248/65 |
| 4,566,660 | A | * | 1/1986 | Anscher | F16L 3/13 24/453 |
| 7,100,808 | B2 | * | 9/2006 | Hancock | F16L 3/10 224/547 |
| 7,806,374 | B1 | * | 10/2010 | Ehmann | H02G 3/22 248/67.5 |
| 8,707,599 | B2 | * | 4/2014 | White | G09F 15/00 40/661.03 |
| D706,225 | S | * | 6/2014 | deLoache, III | D13/155 |
| 9,711,956 | B1 | * | 7/2017 | Welch | H02G 1/085 |
| 9,866,004 | B2 | | 1/2018 | Vaccaro | |

(Continued)

*Primary Examiner* — Paresh Paghadal
(74) *Attorney, Agent, or Firm* — Myers Bigel, P.A.

(57) ABSTRACT

The present disclosure describes grommets formed of a polymeric material and adapted for holding a plurality of discrete cables. A grommet may comprise two halves, each half comprising: a main body having a generally arced outer surface, a plurality of angled cantilevered tines integrally coupled to the main body and extending generally radially inward from the main body; and a slidable interconnection feature integral with the main body, wherein the slidable interconnection feature for each respective half is dimensioned to mate with the slidable interconnection feature of the other half, allowing the two halves to slide into an interlocking position with each other when compressed together.

14 Claims, 7 Drawing Sheets

(56) References Cited

U.S. PATENT DOCUMENTS

| | | | |
|---|---|---|---|
| 11,091,103 B2* | 8/2021 | Winkler | B60R 11/06 |
| 2012/0006947 A1* | 1/2012 | Gundel | F16L 3/02 |
| | | | 248/68.1 |
| 2014/0090874 A1* | 4/2014 | Winkler | H02G 3/0406 |
| | | | 174/135 |
| 2016/0018024 A1* | 1/2016 | Noble | F16L 3/2235 |
| | | | 248/68.1 |
| 2017/0108147 A1* | 4/2017 | Cindrich | H02G 3/00 |
| 2019/0143912 A1* | 5/2019 | Schwiderski | B60R 16/0215 |
| | | | 248/63 |
| 2020/0041042 A1* | 2/2020 | Vaccaro | H02G 3/32 |
| 2020/0304061 A1* | 9/2020 | Jette | H02G 3/30 |
| 2020/0321761 A1* | 10/2020 | Varale | F16L 3/13 |
| 2021/0092865 A1* | 3/2021 | Gentile | F28D 1/0477 |

* cited by examiner

GROMMETS FOR HOLDING CABLES

RELATED APPLICATION(S)

The present application claims priority from and the benefit of U.S. Provisional Application No. 62/712,631, filed Jul. 31, 2018, the disclosure of which is hereby incorporated herein in its entirety.

FIELD OF THE INVENTION

The invention relates to grommets for holding cables, and more particular, grommets for holding cables for use with cable hangers.

BACKGROUND OF THE INVENTION

Until recently, antenna towers have typically employed RF coaxial cables for power and/or signal communications. Such cables are often mounted to the tower via cable hangers, which capture the cable and mount it to the tower. One popular variety of cable hanger is a "stackable" hanger, which has the capacity to mount via snap latches to another hanger, thereby enabling multiple cables to be mounted in a "stack"; an exemplary stackable hanger is the EZS hanger, available from Andrew, Inc. (Joliet, Ill.). Snap-in hangers are often desirable due to their ease of use, although cable hangers that are not stackable are often employed also.

Operators have begun to replace traditional RF cables on towers with fiber optic and/or hybrid fiber/power cables. These new cables (especially the hybrid styles) can have a slightly irregular shape. Also, fiber optic and hybrid fiber/power cables are typically heavy (in some instances three to four times the weight per unit length of traditional RF cable). In addition to being of a slightly irregular shape, the diameter over-jacket (DOJ) of a cable can be vastly different from traditional RF cables.

As a result, in practice some operators use standard hangers in combination with grommets to hang fiber or hybrid fiber cable. The grommets are a fairly soft polymer (e.g., EPDM, nylon, or the like). The outer diameter of the grommet mimics the RF cable size in order to fit in the hanger, whereas the inner diameter is configured to grip the fiber/hybrid fiber cable. In some grommets, multiple holes are included to accommodate multiple cables (e.g., fiber, power, signal, etc.). However, the grommets may be sized poorly for the cables they receive and/or may slip from the hanger. As such, modifications to improve the holding of cables via such grommets may be desirable.

SUMMARY OF THE INVENTION

A first aspect of the present invention is directed to a grommet formed of a polymeric material and adapted for holding a plurality of discrete cables. The grommet may comprise two halves. Each half may comprise a main body having a generally arced outer surface, a plurality of angled cantilevered tines integrally coupled to the main body and extending radially inward from the main body, and a slidable interconnection feature integral with the main body. The slidable interconnection feature for each respective half may be dimensioned to mate with the slidable interconnection feature of the other half to allow the two halves to slide into an interlocking position with each other when compressed together.

Another aspect of the present invention is directed to another grommet formed of a polymeric material and adapted for holding a plurality of discrete cables. The grommet may comprise two halves. Each half may comprise a main body having a generally circular outer surface surrounding an interior cavity, a plurality of spaced-apart flexible spokes integrally coupled to the main body and extending radially inward into the interior cavity, and a mating rotational feature on the face of the main body. The mating rotational feature for each respective half may be dimensioned to mate with the mating rotational feature of the other half when the two halves are relatively rotated together.

A further aspect of the present invention is directed to another grommet formed of a polymeric material and adapted for holding a plurality of discrete cables. The grommet may comprise two halves. Each half may comprise a main body comprising a slidable interconnection feature; a plurality of spaced-apart splines integrally coupled and extending outward from the main body and adapted to receive a cable between each spline, and a compression member integrally coupled to the main body. The slidable interconnection feature for each respective half may be dimensioned to mate with in the slidable interconnection feature of the other half to allow the two halves to slide into an interlocking position with each other when compressed together.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF THE INVENTION

Figure 1A:
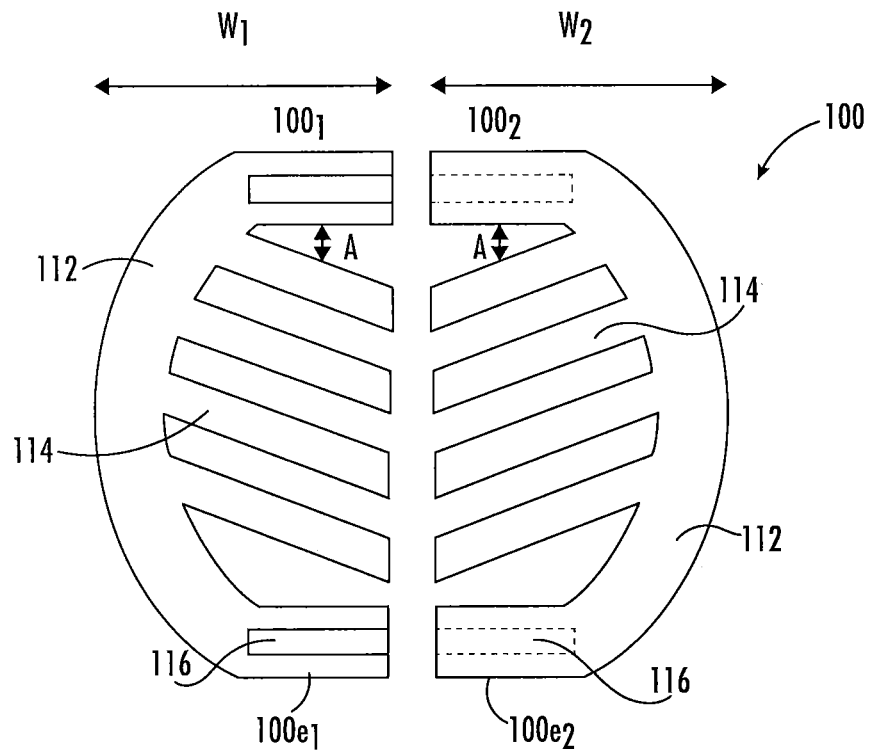
FIG. 1A is a top view of a grommet according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements and different embodiments of like elements can be designated using a different number of superscript indicator apostrophes (e.g., 10, 10', 10").

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the figures, a grommet 100 according to some embodiments of the present invention is illustrated in FIGS. 1-4. The grommet 100 may be formed of a polymeric material and is adapted for holding a plurality of discrete cables 20 (see, e.g., FIG. 3). Exemplary types of cables 20 that may be held together using a grommet 100 of the present invention include, but are not limited to, fiber optic cables and hybrid fiber/power cables. In some embodiments, the polymeric material forming the grommet 100 may comprise rubber, polypropylene, polyethylene, acrylonitrile butadiene styrene (ABS), nylon, acetal, ethylene propylene diene monomer (EPDM) rubber, or the like.

Figure 1B:
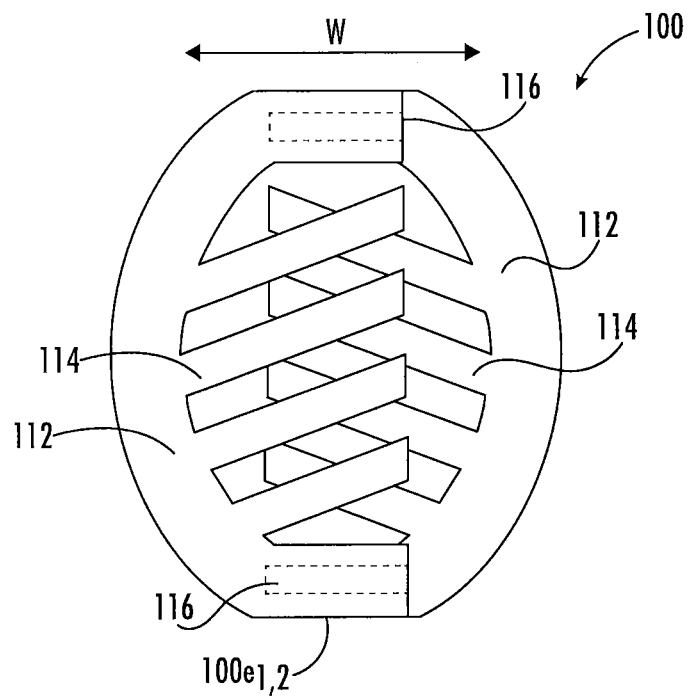
FIG. 1B is a top view of the grommet of FIG. 1 in a closed position.
Figure 2:
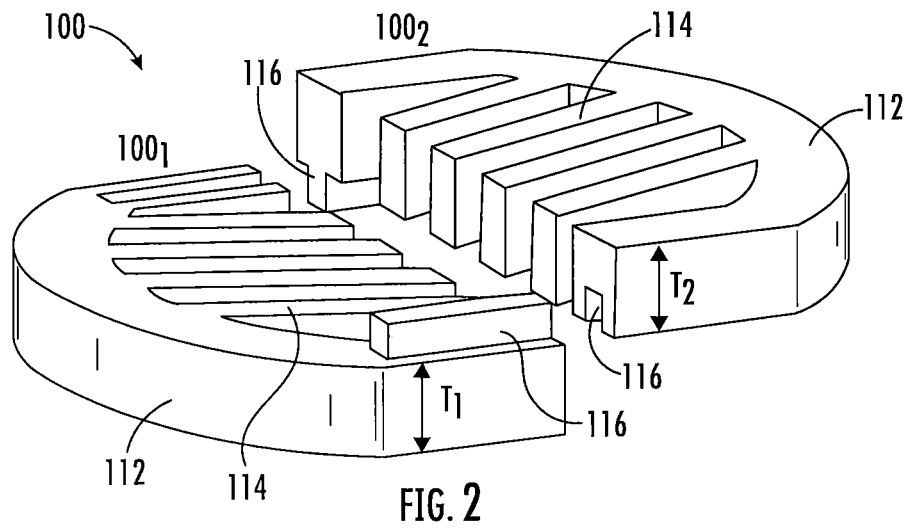
FIG. 2 is a front perspective view of the grommet of FIG. 1A.

Referring to FIGS. 1A-1B and FIG. 2, the grommet 100 may comprise two halves $100_1$, $100_2$. Each half $100_1$, $100_2$ of the grommet 100 comprises a main body 112. In some embodiments, the main body 112 of each half $100_1$, $100_2$ may have a generally arced outer surface. In some embodiments, the outer surface of the main body 112 may have a different shape, such as, for example, square, rectangular, hexagonal, or octagonal. In some embodiments, the outer surface of the main body 112 may comprise a flat edge 100e (see, e.g., FIGS. 1A-1B)

Each half $100_1$, $100_2$ of the grommet 100 may have a width ($W_1$, $W_2$) and a thickness ($T_1$, $T_2$). The grommet 100 may have a width (W) when the two halves $100_1$, $100_2$ are in a closed position (see, e.g., FIG. 1B). In some embodiments, each half of a grommet of the present invention may have an equal width ($W_1$, $W_2$) of about 5 mm to about 50 mm. In some embodiments, a grommet 100 of the present invention may have a width (W) of about 7 mm to about 75 mm. In some embodiments, each half $100_1$, $100_2$ of a grommet 100 of the present invention may have a thickness of about 1 mm to about 35 mm Typically, each half $100_1$, $100_2$ of the grommet 100 will have the same thickness ($T_1$, $T_2$); however, in some embodiments, the thickness ($T_1$, $T_2$) of each half $100_1$, $100_2$ may be different.

Each half $100_1$, $100_2$ of the grommet 100 may comprise a slideable interconnection feature 116 integral with the main body 112. The slideable interconnection feature 116 may be located near the flat edge of the outer surface of the main body 112. The slideable interconnection feature 116 for each respective half $100_1$, $100_2$ of the grommet 100 may be dimensioned to mate with the slideable interconnection feature 116 of the other half $100_1$, $100_2$.

As will be discussed in further detail below, the slideable interconnection feature 116 of each half $100_1$, $100_2$ of the grommet 100 allows the two halves $100_1$, $100_2$ of the grommet 100 to slide into an interlocking position with each other when the two halves $100_1$, $100_2$ are compressed together (see, e.g., FIG. 1B and FIGS. 4A-4B). Different interconnecting features can be used for the slideable interconnection feature 116 of the grommet 100. For example, in some embodiments, the slideable interconnection feature 116 may be a "tongue and groove" arrangement, where a "tongue" is present adjacent to one edge $100e_1$ of each half $100_1$, $100_2$ and the "groove" is present adjacent to the other edge $100e_2$ of each half $100_1$, $100_2$.

A plurality of cantilevered tines 114 may be integrally coupled to the main body 112 of each half $100_1$, $100_2$. Each cantilevered tine 114 may extend generally radially inward from the main body 112. The cantilevered tines 114 are spaced apart from each other a distance sufficient to allow a cable 20 to fit between each adjacent pair of cantilevered tines 114. For example, in some embodiments, the cantilevered tines 114 are spaced apart a distance of about 1 mm to about 50 mm. In some embodiments, the cantilevered tines 114 are spaced apart a distance sufficient to hold a cable 20 having a diameter of about 1 mm to about 50 mm.

In some embodiments, the cantilevered tines 114 may extend generally radially inward from the main body 112 at an angle (A) relative to the longitudinal axis of the direction that the two halves $100_1$, $100_2$ slide together. For example, in some embodiments, each cantilevered tine 114 may extend radially inward from the main body 112 at an angle (A) of about 5 degrees to about 45 degrees.

Figure 4A:
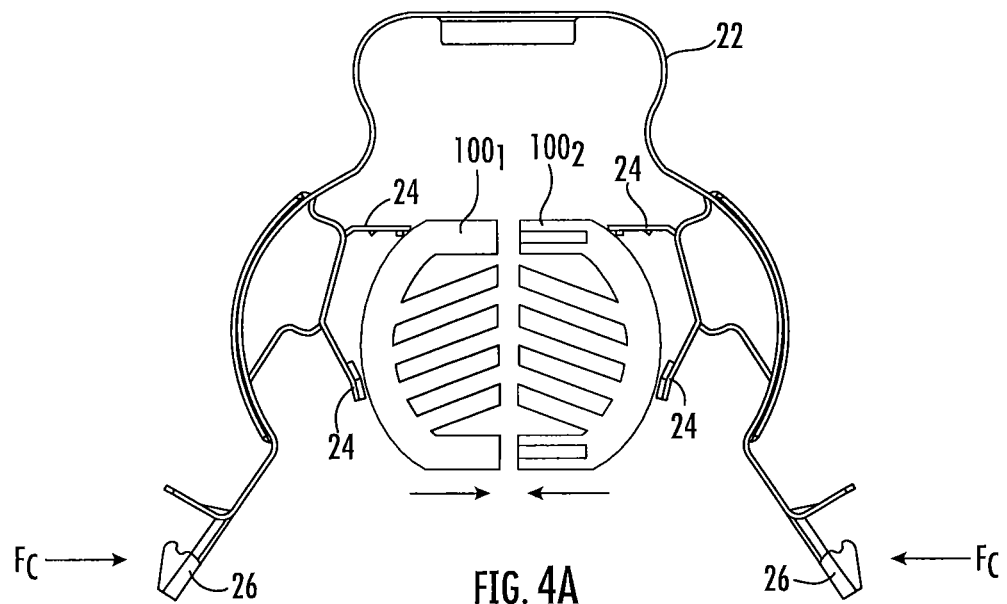
FIG. 4A is a top view of the grommet of FIG. 1 in combination with a cable hanger showing the grommet in an open position.
Figure 4B:
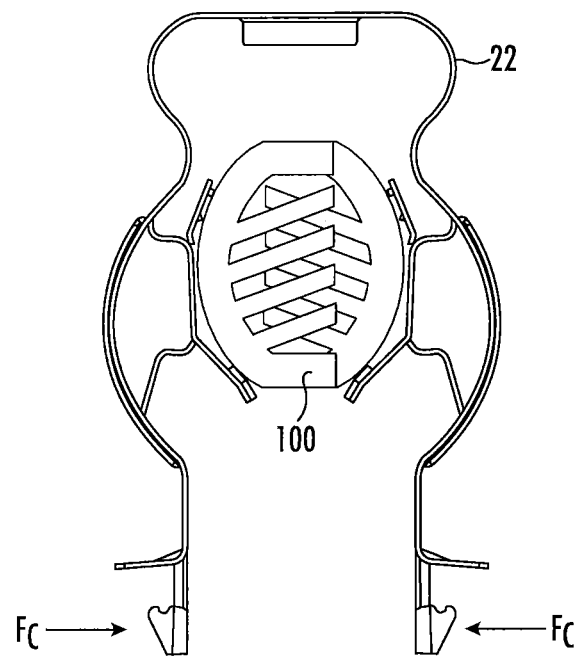
FIG. 4B is a top view of the grommet of FIG. 1 in combination with a cable hanger showing the grommet in a closed position.

Referring now to FIG. 4A and FIG. 4B, a grommet 100 of the present invention may be dimensioned to fit within a cable hanger 22. Exemplary cable hangers 22 with which a grommet 100 of the present invention may be used in conjunction are shown in U.S. Pat. No. 9,866,004 to Vaccaro et al. which is incorporated by reference in its entirety herein. A cable hanger 22 may have opposable gripping members 24 and locking projections 26. The opposable gripping members 24 can help to grip and to center the two halves $100_1$, $100_2$ of the grommet 100 within the cable hanger 22 and to assist in aligning the slidable interconnection feature 116 of each half $100_1$, $100_2$. The opposable gripping members 24 are deployed to deflect radially outwardly when the cable hanger 22 receives a grommet 100 for mounting. This deflection generates a radially inward force from each gripping member 24 that grips each half $100_1$, $100_2$ of the grommet 100.

Figure 3:
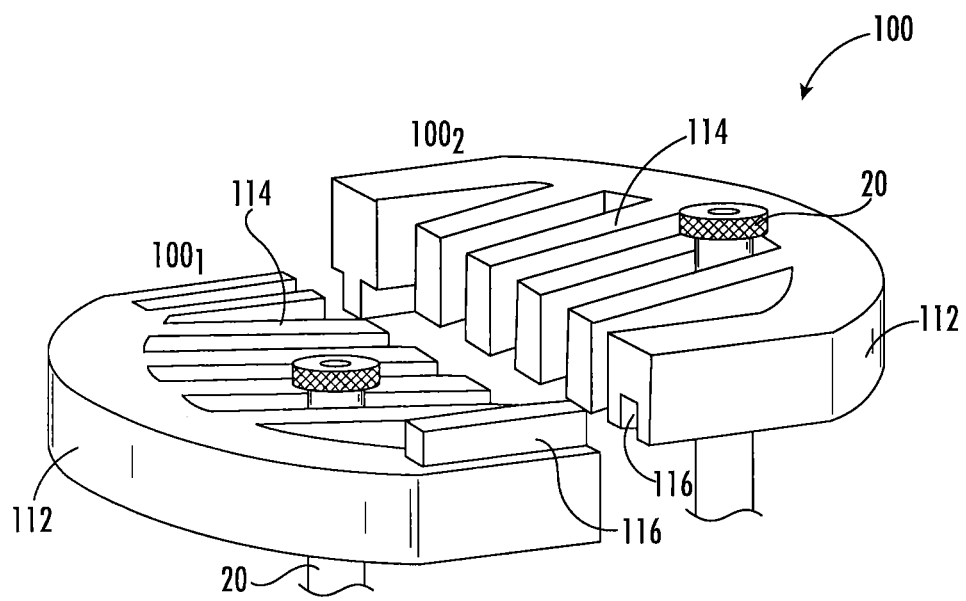
FIG. 3 is a front perspective view of the grommet of FIG. 1 in combination with a plurality of discrete cables.

When a compressive force ($F_C$) is applied on the locking projections 26 of the cable hanger 22, the two halves $100_1$, $100_2$ of the grommet 100 may be slid toward each other between the opposable gripping members 24 (FIG. 3). As mentioned above, the slideable interconnection feature 116 of each half $100_1$, $100_2$ of the grommet 100 allows the two halves $100_1$, $100_2$ to slide into an interlocking position with each other as the compression force ($F_C$) on the locking projections 26 pushes of the two halves $100_1$, $100_2$ of the grommet 100 together. When the two halves $100_1$, $100_2$ of the grommet 100 slide into an interlocking position, the cantilevered tines 114 may overlap in an intersecting relationship. The grommet 100 becomes secured within the cable hanger 22 when the locking projections 26 of the cable hanger 22 are in a closed and locked position (e.g., secured onto a mounting or support structure).

As shown in FIG. 3, the grommet 100 may have a plurality of discrete cables 20 residing between the angled cantilevered tines 114 of both halves $100_1$, $100_2$ of the grommet 100. As the compression force ($F_C$) from the opposable gripping members 24 pushes the two halves $100_1$, $100_2$ of the grommet 100 together, the cantilevered tines 114 may deflect, which can increase the gripping force of the cantilevered tines 114 on the cables 20. Also, the plurality of discrete cables 20 may twist between the cantilevered tines 114, which can provide stability to the grommet 100 and increase the surface friction between the cantilevered tines 114 and the cables 20. The cantilevered tines 114 may also uniformly distribute compressive forces on the cables 20, thus further aiding in retention of the cables 20 within the grommet 100.

Figure 5A:
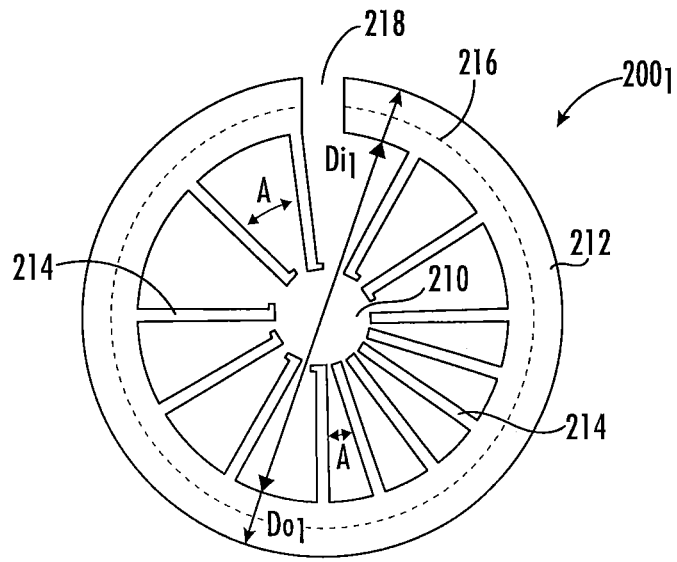
FIG. 5A is a top view of one half of a grommet according to alternative embodiments of the present invention.
Figure 5B:
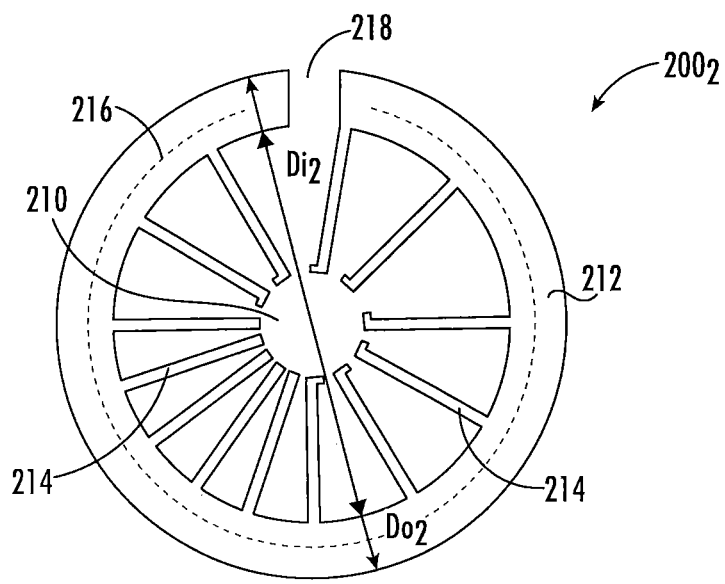
FIG. 5B is a top view of the other half of the grommet of FIG. 5A.
Figure 5C:
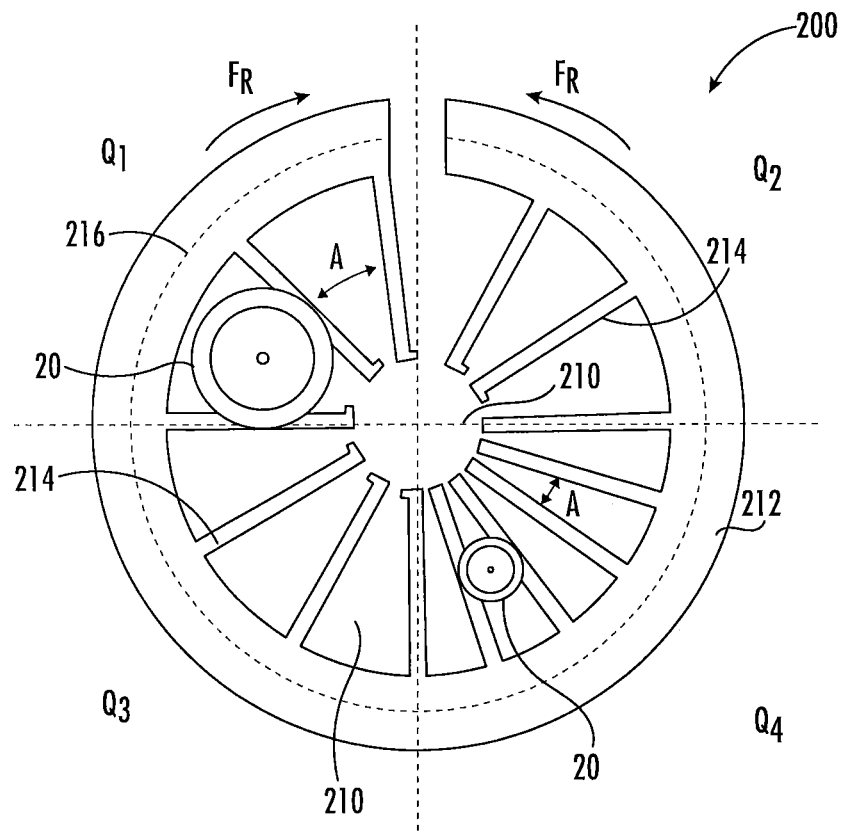
FIG. 5C is a top view of the grommet of FIG. 5A and FIG. 5B in combination with a plurality of discrete cables.

Referring now to FIGS. 5A-5C, a grommet 200 according to further embodiments of the present invention is illustrated. The grommet 200 may be formed of a polymeric material and is adapted for holding a plurality of discrete cables 20. As discussed above, exemplary types of cables 20 that may be held together using a grommet 200 of the present invention include, but are not limited to, fiber optic cables and hybrid fiber/power cables. In some embodiments, the polymeric material forming the grommet 200 may comprise rubber, polypropylene, polyethylene, acrylonitrile butadiene styrene (ABS), nylon, acetal, ethylene propylene diene monomer (EPDM) rubber, or the like.

In some embodiments, the grommet 200 may comprise two halves $200_1$, $200_2$. Each half $200_1$, $200_2$ of the grommet 200 comprises a main body 212. In some embodiments, the main body 212 may have a generally circular or c-shaped outer surface. The outer surface of the main body 212 may have a different shape, such as, for example, elliptical, hexagonal, or octagonal. The main body 212 of each half $200_1$, $200_2$ of the grommet 200 surrounds an interior cavity 210.

Each half $200_1$, $200_2$ of the grommet 200 may have an inner diameter ($Di_1$, $Di_2$) and an outer diameter ($Do_1$, $Do_2$) and a thickness. In some embodiments, a grommet 200 of the present invention may have an inner diameter ($Di_1$, $Di_2$) of about 10 mm to about 70 mm and an outer diameter ($Do_1$, $Do_2$) of about 12 mm to about 72 mm. In some embodiments, each half $200_1$, $200_2$ of a grommet 200 of the present invention may have a thickness of about 1 mm to about 35 mm. Typically, each half $200_1$, $200_2$ of the grommet 200 will have the same thickness; however, in some embodiments, the thickness of each half $200_1$, $200_2$ may be different.

A plurality of flexible spokes 214 may be integrally coupled to the main body 212 of each half $200_1$, $200_2$ and extend radially inward from the main body 212 into the interior cavity 210. The flexible spokes 214 are spaced apart from each other a distance sufficient to allow a cable 20 to fit between each adjacent pair of spokes 214.

Also, the flexible spokes 214 may extend radially inward from the main body 212 such that they divide the interior cavity 210 into pockets with angular arcs (A) of different magnitude. For example, in some embodiments, the spokes 214 may extend radially inward from the main body 212 to different pockets covering angular arcs (A) of between about 15 degrees to about 145 degrees.

Each half $200_1$, $200_2$ of the grommet 200 may comprise a mating rotational feature 216 on a face of the main body 212. The mating rotational feature 216 for each respective half $200_1$, $200_2$ may be dimensioned to mate with the mating rotational feature 216 of the other half $200_1$, $200_2$. The mating rotational features 216 of each half $200_1$, $200_2$ of the grommet 200 allows the two halves $200_1$, $200_2$ to rotate together into an interlocking position with each other when the two halves $200_1$, $200_2$ are relatively rotated together. Different mating features can be used for the mating rotational feature 216 of the grommet 200. For example, in some embodiments, the mating rotational feature 216 may be threads (e.g., internal threads on one half $200_1$ and external threads on the other half $200_2$.

As illustrated in FIG. 5C, in some embodiments the interior cavity 210 of the grommet 200 may be divided into quadrants ($Q_1$, $Q_2$, $Q_3$, $Q_4$). Each quadrant ($Q_1$, $Q_2$, $Q_3$, $Q_4$) may be adapted to hold cables 20 having different diameters, i.e., the spokes are spaced apart such that the pockets cover different angular arcs (A) for each quadrant ($Q_1$, $Q_2$, $Q_3$, $Q_4$). For example, as shown in FIG. 5C, in some embodiments, quadrant one ($Q_1$) may be adapted to hold a larger diameter cable 20 than quadrant four ($Q_4$).

Still referring to FIG. 5C, the grommet 200 may have a plurality of discrete cables residing between the plurality of flexible spokes 214 of both halves $200_1$, $200_2$ of the grommet 200. When a rotational force ($F_R$) is applied to each half $200_1$, $200_2$ to mate the rotational features of both halves $200_1$, $200_2$ together, the flexible spokes 214 may deflect due to the cables 20 residing between the flexible spokes 214, thereby gripping and securing the cables 20 within the grommet 200. This can provide stability to the grommet 200 and increase the surface friction between the flexible spokes 214 and the cables 20. The flexible spokes 214 may also uniformly distribute compressive forces on the cables 20, thus further aiding in retention of the cables 20 within the grommet 200.

In some embodiments, the main body 212 of each half $200_1$, $200_2$ of the grommet 200 may comprise a slot 218. The slot 218 provides an entry point for the cables 20 to be inserted into the interior cavity 210 of each half $200_1$, $200_2$ of the grommet 200. The polymeric material that forms each half $200_1$, $200_2$ and flexible spokes 214 of the grommet 200 gives the halves $200_1$, $200_2$ and flexible spokes 214 a certain degree of flexibility, such that the main body 212 may be deflected to an open position to enable insertion of the cables 20 or the flexible spokes 214 can be torqued against the cables 20.

Once the cables 20 are positioned within the interior cavity 210 of each half $200_1$, $200_2$ of the grommet 200, the resilient nature of polymeric material allows the main body 212 of each half $200_1$, $200_2$ to recover to its original size, thereby holding the cables 20 together and securing them within the two halves $200_1$, $200_2$ of the grommet 200. Similarly, when the cables 20 are removed from the grommet 200, the flexible spokes 214 are able to recover to their original position. Like discussed above, the grommet 200 is typically used in conjunction with a cable hanger 22.

Figure 6:
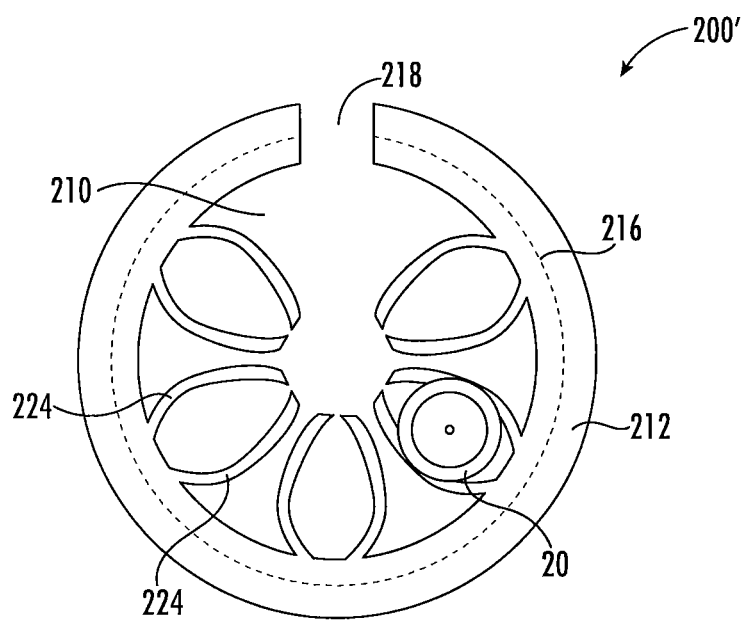
FIG. 6 is a top view of a grommet comprising pairs of arcuate spokes according to alternative embodiments of the present invention.

The plurality of flexible spokes 214 may comprise pairs of flexible spokes. For example, in some embodiments, a grommet 200' of the present invention may comprise flexible spokes that are pairs of arcuate spokes 224 (see, e.g., FIG. 6). A cable 20 may be held between the pair of arcuate spokes 224.

Figure 7:
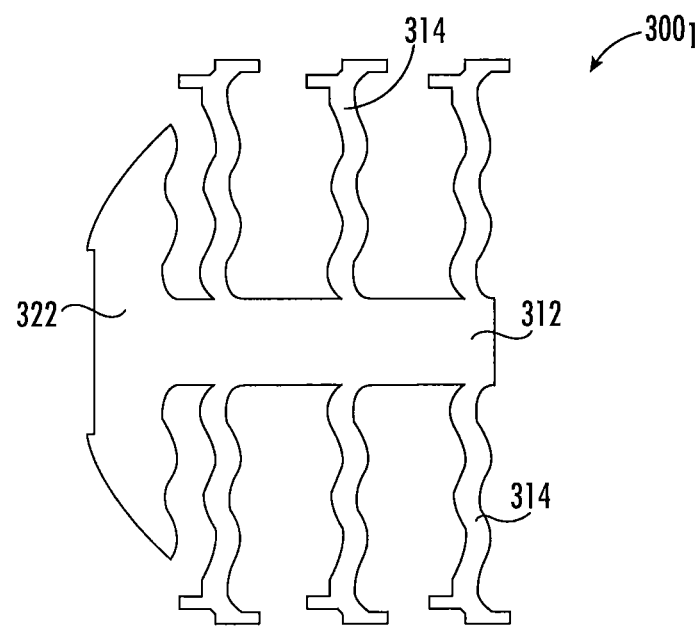
FIG. 7 is a top view of one half of a grommet according to further embodiments of the present invention.
Figure 8:
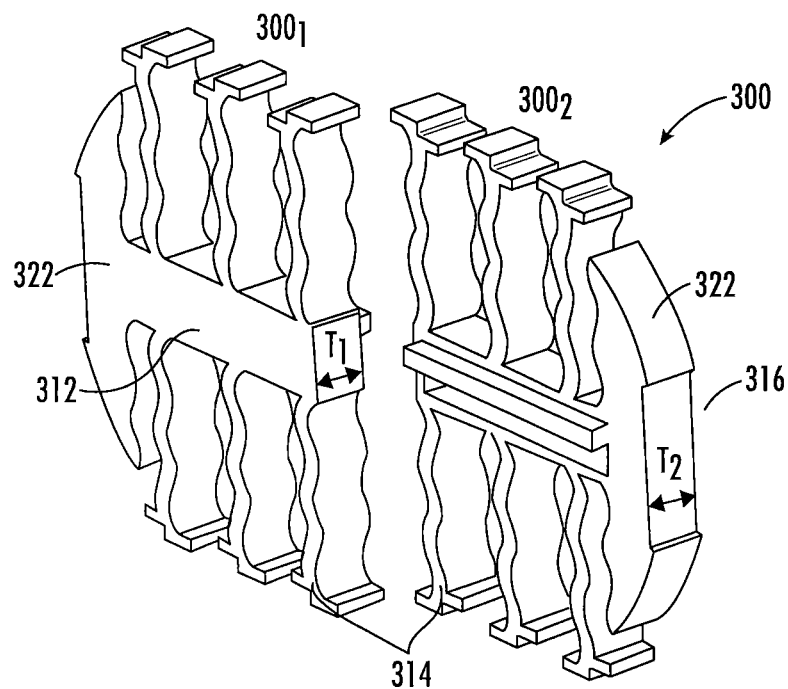
FIG. 8 is a front perspective view of both halves of the grommet of FIG. 7.

Referring now to FIG. 7 and FIG. 8, a grommet 300 according to further embodiments of the present invention is illustrated. The grommet 300 may be formed of a polymeric material and is adapted for holding a plurality of discrete cables 20. Exemplary types of cables 20 that may be held together using a grommet 300 of the present invention include, but are not limited to, fiber optic cables and hybrid fiber/power cables. In some embodiments, the polymeric material forming the grommet 300 may comprise rubber, polypropylene, polyethylene, acrylonitrile butadiene styrene (ABS), nylon, acetal, ethylene propylene diene monomer (EPDM) rubber, or the like.

In some embodiments, the grommet 300 may comprise two halves $300_1$, $300_2$. Each half $300_1$, $300_2$ of the grommet comprises a main body 312. A compression member 322 may be integrally coupled to the main body 312 of each half $300_1$, $300_2$. In some embodiments, each half $300_1$, $300_2$ of a grommet 300 of the present invention may have a thickness of about 1 mm to about 35 mm. Typically, each half $300_1$, $300_2$ of the grommet 300 will have the same thicknesses ($T_1$, $T_2$); however, in some embodiments, the thickness ($T_1$, $T_2$) of each half $300_1$, $300_2$ may be different.

A plurality of splines 314 may be integrally coupled to the main body 312 of each half $300_1$, $300_2$ and extend outwardly from the main body 312. The splines 314 are spaced apart from each other a distance sufficient to allow a cable 20 to fit between each pair of adjacent splines 314. For example, in some embodiments, the splines 314 are spaced apart a distance of about 1 mm to about 50 mm to hold a cable 20 having a diameter of about 1 mm to about 50 mm.

Each half $300_1$, $300_2$ of the grommet 300 may comprise a slideable interconnection feature 316 integral with the main body 312. The slideable interconnection feature 316 for each respective half $300_1$, $300_2$ of the grommet 300 may be dimensioned to mate with the slideable interconnection feature 316 of the other half $300_1$, $300_2$. Similar to previously described embodiments, and as shown in FIG. 7, the slideable interconnection feature 316 of each half $300_1$, $300_2$ of the grommet 300 allows the two halves $300_1$, $300_2$ to slide into an interlocking position with each other when the two halves $300_1$, $300_2$ are compressed together. Different interconnecting features can be used for the slideable interconnection feature 316 of the grommet 300. For example, in some embodiments, the slideable interconnection feature 316 may be a tongue and groove feature.

Like discussed above, a grommet 300 of the present invention may be dimensioned to fit within a cable hanger 22 having opposable gripping members 24 and locking projections 26. The opposable gripping members 24 can help to grip and to center the two halves $300_1$, $300_2$ of the grommet 300 within the cable hanger 22 making sure the slidable interconnection features 316 of each half $300_1$, $300_2$ are in alignment. The opposable gripping members 24 are deployed to deflect radially outwardly when the cable hanger 22 receives a grommet 300 for mounting; this deflection generates a radially inward force from each gripping member 24 that grips each half $300_1$, $300_2$ of the grommet 300. When a compressive force ($F_C$) is applied on the locking projections 26 of the cable hanger 22, the two halves $300_1$, $300_2$ of the grommet 300 may be compressed and pushed together between the opposable gripping members 24. The slideable interconnection feature 316 of each half $300_1$, $300_2$ of the grommet 300 allows the two halves $300_1$, $300_2$ to slide into an interlocking position with each other as the force ($F_C$) on the locking projections 26 pushes of the two halves $300_1$, $300_2$ of the grommet 300 together. The grommet 300 becomes secured within the cable hanger 22 when the locking projections 26 of the cable hanger 22 are in a closed and locked position (e.g., secured onto a mounting or support structure).

Figure 9:
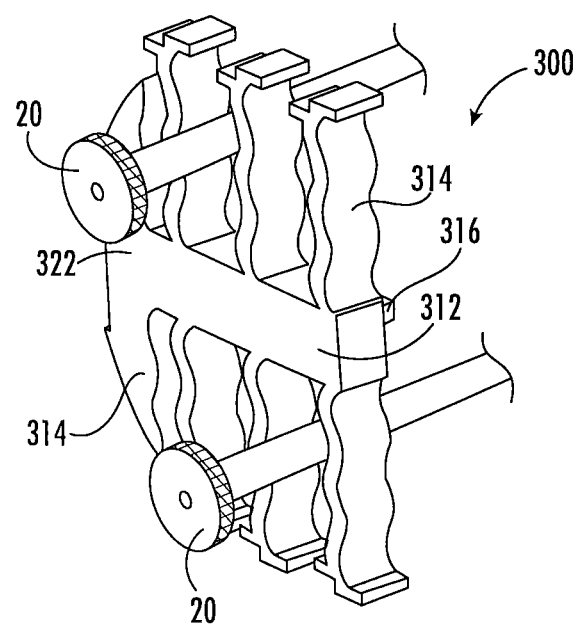
FIG. 9 is a front perspective view of the grommet of FIG. 7 in combination with a plurality of discrete cables.

As shown in FIG. 9, the grommet 300 may have a plurality of discrete cables 20 residing between the spaced apart splines 314 of both halves $300_1$, $300_2$ of the grommet 300. The compression force ($F_C$) from the opposable gripping members 24 that pushes the two halves $300_1$, $300_2$ of the grommet 300 together allow the splines 314 to grip and secure the cables 20 within the grommet 300. The splines 314 can deflect as needed to enable the halves $300_1$, $300_2$ to slide even with the cables 20 present. This can provide stability to the grommet 100 and increase the surface friction between the splines 314 and the cables 20. The splines 314 may also uniformly distribute compressive forces on the cables 20, thus further aiding in retention of the cables 20 within the grommet 300.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A grommet formed of a polymeric material and adapted for holding a plurality of discrete cables, the grommet comprising:
   two separate halves, each half comprising:
      a main body having a generally arced outer surface;
      a plurality of angled cantilevered tines integrally coupled to the main body and extending generally radially inward from the main body; and
      a slidable interconnection feature integral with the main body, wherein the slidable interconnection feature for each respective half is dimensioned to mate with the slidable interconnection feature of the other half, allowing the two halves to slide into an interlocking position with each other when in a compressed state,
      wherein each cantilevered tine extends radially inward from an inner surface of the main body at an angle of about 5 degrees to about 45 degrees, and
   wherein, when in the compressed state, the free ends of the cantilevered tines of one half of the grommet overlap with the free ends of the cantilevered tines of the other half of the grommet in an intersecting relationship to engage the plurality of discrete cables therebetween.

2. The grommet of claim 1, wherein the slidable interconnection feature is a tongue and groove feature.

3. The grommet of claim 1, in combination with a cable hanger, wherein the cable hanger has opposable gripping members and the grommet is compressed between the opposable gripping members pushing the two halves together, thereby securing the grommet within the cable hanger.

4. The grommet of claim 3, in combination with a plurality of discrete cables, wherein the plurality of discrete cables resides between the angled, cantilevered tines of both halves and the compression from the opposable gripping members pushing the two halves together secures the plurality of discrete cables between the two sets of cantilevered tines.

5. The grommet of claim 1, wherein the polymeric material comprises polyethylene.

6. The grommet of claim 1, wherein the plurality of discrete cables comprises cables selected from a group consisting of fiber optic cables and hybrid fiber/power cables.

7. A grommet formed of a polymeric material and adapted for holding a plurality of discrete cables, in combination with a cable hanger, the grommet comprising:
   two halves, each half comprising:
      a main body having a generally arced outer surface;
      a plurality of angled cantilevered tines integrally coupled to the main body and extending parallel to each other and generally radially inward from an inner surface of the main body; and
      a slidable interconnection feature integral with the main body, wherein the slidable interconnection feature for each respective half is dimensioned to mate with the slidable interconnection feature of the other half, allowing the two halves to slide into an interlocking position with each other when in a compressed state;
   wherein the cable hanger has opposable gripping members and the grommet is compressed between the opposable gripping members pushing the two halves together, thereby securing the grommet within the cable hanger,
   wherein, when the two halves are in a compressed state, the free ends of the angled cantilevered tines of one half of the grommet overlap the free ends of the angled cantilevered tines of the other half of the grommet in an intersecting relationship to engage the plurality of discrete cables therebetween.

8. The grommet of claim 7, in combination with a plurality of discrete cables, wherein the plurality of discrete cables resides between the angled, cantilevered tines of both halves and the compression from the opposable gripping members pushing the two halves together secures the plurality of discrete cables between the two sets of cantilevered tines.

9. The grommet of claim 8, wherein the plurality of discrete cables comprises cables selected from a group consisting of fiber optic cables and hybrid fiber/power cables.

10. The grommet of claim 7, wherein the slidable interconnection feature is a tongue and groove feature.

11. The grommet of claim 7, wherein each cantilevered tine extends radially inward from the main body at an angle of about 5 degrees to about 45 degrees.

12. A grommet formed of a polymeric material, in combination with a cable hanger and a plurality of discrete cables, the grommet comprising:
   two separate halves, each half comprising:
      a main body having a generally arced outer surface;
      a plurality of angled cantilevered tines integrally coupled to the main body and extending generally radially inward from the main body; and
      a slidable interconnection feature integral with the main body, wherein the slidable interconnection feature for each respective half is dimensioned to mate with the slidable interconnection feature of the other half, allowing the two halves to slide into an interlocking position with each other when in a compressed state,
      wherein each cantilevered tine extends radially inward from the main body at an angle of about 5 degrees to about 45 degrees,
   wherein the cable hanger has opposable gripping members and the grommet is compressed between the opposable gripping members pushing the two halves together, thereby securing the grommet within the cable hanger, and
   wherein the plurality of discrete cables resides between the angled, cantilevered tines of both halves and the compression from the opposable gripping members pushing the two halves together secures the plurality of discrete cables between the two sets of cantilevered tines, and
   wherein, when in the compressed state, the free ends of the cantilevered tines of one half of the grommet overlap with the free ends of the cantilevered tines of the other half of the grommet in an intersecting relationship to engage the plurality of discrete cables therebetween.

13. The grommet of claim 12, wherein the plurality of discrete cables comprises cables selected from a group consisting of fiber optic cables and hybrid fiber/power cables.

14. The grommet of claim 12, wherein the slidable interconnection feature is a tongue and groove feature.

* * * * *